April 7, 1970   D. C. HARPER   3,504,960

SAGITTAL RAY APERTURE STOP

Filed Oct. 11, 1966   2 Sheets-Sheet 1

INVENTOR.
DAVID C. HARPER
BY
ATTORNEYS

April 7, 1970     D. C. HARPER     3,504,960
SAGITTAL RAY APERTURE STOP

Filed Oct. 11, 1966     2 Sheets-Sheet 2

INVENTOR.
DAVID C. HARPER
BY
ATTORNEYS

United States Patent Office 3,504,960
Patented Apr. 7, 1970

3,504,960
SAGITTAL RAY APERTURE STOP
David C. Harper, Rochester, N.Y., assignor to Xerox Corporation, Rochester, N.Y., a corporation of New York
Filed Oct. 11, 1966, Ser. No. 585,936
Int. Cl. G02b 9/00, 21/06; G02f 1/30
U.S. Cl. 350—205      7 Claims

ABSTRACT OF THE DISCLOSURE

An optical system for imaging a narrow format comprising lens means optically positioned to receive and project illumination rays from said narrow format onto an imaging plane, aperture stop means positioned in close proximity to said lens means to control illumination at said imaging plane, and masking means defining a narrow slit extending in a direction parallel to said narrow format and interposed in the optical path to reduce substantially sagittal rays at the image plane without affecting tangential rays thereat.

---

This invention relates to optical lenses and particularly to stops used in conjunction with lenses.

More specifically this invention relates to the use of stops for lenses covering a format being narrow in one dimension.

The invention here will improve image quality generally, especially in lenses corrected for tangential oblique spherical aberration. The majority of photographic objective lenses have considerable oblique spherical aberration which reduces the contrast in the field. As the tangential image is much worse than the image in the plane in the direction normal to the tangential image, hereinafter called the sagittal direction, vignetting is used to improve the tangential image. This, of course, reduces field illumination, and although many photographic applications require only 25 to 30% relative illumination some require high illumination, for example, slow photoreceptors require substantial illumination to effect exposure and any loss becomes critical.

To obtain a sharp image along with high relative illumination, oblique spherical aberration must be corrected. As a lens design is modified to correct oblique spherical aberration, the tangential image generally improves faster than the sagittal. If the sagittal error is reduced to zero, the tangential image is normally over-compensated. Since manufacturing costs increase with the degree of oblique spherical aberration correction, the tangential oblique spherical is usually optimized while leaving some residual sagittal aberration. On such a lens the invention here is especially helpful in improving overall image quality as well as overall contrast and contrast chiefly in the sagittal direction.

The invention has the further benefit of regulating relative illumination depending merely upon its shape. Further its location is not critical as the sagittal stop can be external to the lens or between the lenses elements. Since the invention can be located external to the lens, the aperture of the invention can be adjusted at less expense than for an iris diaphragm between the lens elements. Further, there is a special advantage in lens designs with air spaces too short for iris diaphragms. There is a further advantage in that this relatively simple stop may be removably placed in an optical system that changes magnification by moving the lenses therein closer to or farther from the image. Normally this movement would change the illumination at the image plane, but the addition of this invention would eliminate the need for an adjustable aperture stop such as an iris diaphragm. Of even more importance is the elimination of the mechanism necessary for changing the aperture.

It is an object of this invention to provide a simple stop mechanism to improve image quality in optical systems with elongated formats.

Another object of this invention is to mask portions of a lens in the sagittal image direction to increase image quality at minimal expense.

A further object of this invention is to provide a stop that can be external to the lens or between the lens elements.

Still another object is to affect relative illumination across the image plane of the optical system.

Yet a further object of this invention is to maintain increase, or decrease illumination in an optical system without the need for expensive methods or equipment to achieve the desired results.

Another object of this invention is to reduce the image degradation due to oblique spherical aberration externally to the lens.

These and other objects of the invention are attained by means of a uni-direction stop placed inside or in close proximity to the lens system of a format which is relatively narrow in one dimension.

For a better understanding of the invention as well as other objects and further features thereof, reference is had to the following detailed description of the invention to be read in conjunction with the accompanying drawings wherein.

The aperture stop of the type which reduces the sagittal image by controlling a portion of the sagittal beam affecting the image plane is herein referred to as a "sagittal stop."

Figure 1:
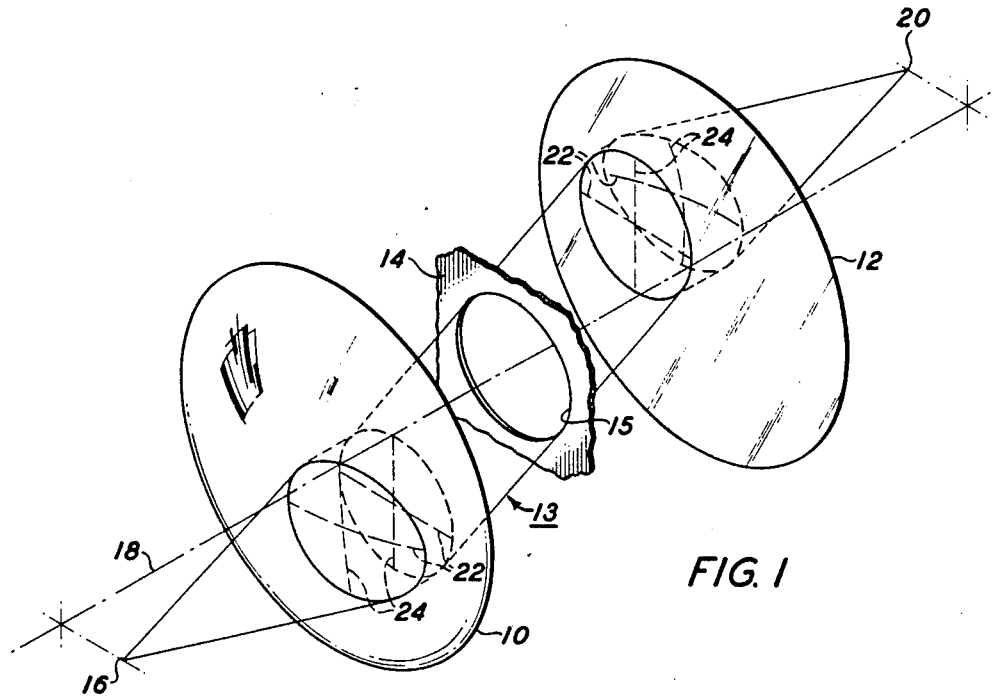
FIG. 1 is a perspective view of the effective beam emanating from a point source and passing through the lenses with a central aperture stop.

Referring now to the drawings, there is shown in FIG. 1 a lens system comprised of a first objective lens 10 and a second objective lens 12 for converging light to an image plane. Between the two lenses 10 and 12 is an internal stop 14 with an illumination limiting aperture 15 for controlling the illumination passing through the system to the image plane. Shown here is the segment 13 of the beam emanating from object point 16, located off the central optical axis 18, which is permitted to pass through aperture 15 to focus at its image point 20.

Represented on lenses 10 and 12 are the tangential axis 22 and the sagittal axis 24 for the given object point as such axes appear on the front and rear surfaces of each lens. It must be noted that as the light rays from an object are dispersed from the optical axis the image that such rays form in an objective lens system, such as that shown here is more likely to be aberrated due to astigmatism and spherical aberration, among other, then the rays passing through the optical system close to the central axis or the tangential plane. Therefore, although shown schematically to meet at image point 20 in FIG. 1, many of the light rays passing above and below the tangential plane of the lens system shown do not in fact meet at point 20 but at some other point approximately near 20 but different therefrom. This phenomenon, caused by aberrations in the lens system cause the point 20 to exist rather as a blur than a single point. This obviously reduces the resolution and contrast of an image comprised of many points such as point 20.

Figure 2:
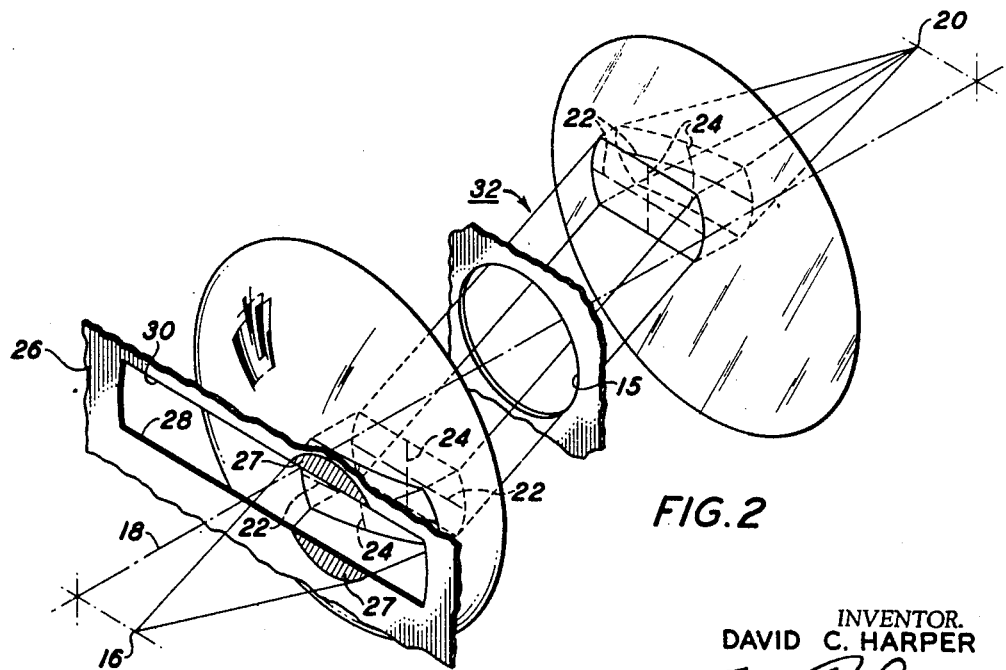
FIG. 2 is a perspective view of the effective beam of the point object passing through a "sagittal stop" and a lens system with a central aperture therein.

In order to reduce the aberrations, especially oblique spherical aberration, that cause the loss of resolution to the image without substantially reducing illumination a "sagittal stop" is employed in the system as shown in FIG. 2. This method of reducing aberrations has an advantage over other methods in that other methods would employ either more expensive lens systems or smaller aperture stops the latter, of course simultaneously reducing the illumination of the image plane. In a configuration or system requiring substantial illumination the latter method of reducing oblique spherical aberration is unacceptable whereas, the fabrication of expensive lenses is generally undesirable due to manufacturing expense. This invention provides an inexpensive easily fabricated, simple device for reducing the oblique spherical aberration without considerable reducing of illumination or the adding of expensive equipment to the lens system. The "sagittal stop" may be machine made or stamped out of inexpensive materials.

The effective beam of light from an object point 16 passing through the system of FIG. 1 with the addition of "sagittal stop" 26 is shown in FIG. 2. It should be noted that the beam is reduced in the sagittal direction, that is along the axis 24 while passing unaffected in the tangential direction, along axis 22, thus providing maximum illumination while reducing undesirable aberrations otherwise caused by the blocked object rays 27 in the sagittal direction. The "sagittal stop" itself is here shown as two parallel edges placed approximately an equal distance from the central axis 18 of the optical system and comprised of an opaque material from each edge in a direction opposite to the axis 18. It is understood that the edges need not be parallel or symmetrical or placed an equal distance from that axis, and this should be in no way considered as a limitation on the scope of the invention disclosed.

Nevertheless, the only light from object point 16 that can enter the lens system is that which passes between the edges 28 and 30 of the "sagittal stop." It should be noted that the "sagittal stop" may be placed between the object and lens system, as shown in FIG. 2, or between the lenses of the lens system, or between the lens system and image with the same imaging results as shown in FIG. 2 without departing from the scope and spirit of the invention since the beam 32 shown in FIG. 2 is merely the effective beam from the point source 16 to its image 20 through a system composed of the "sagittal stop," the aperture stop, and the lenses shown.

Figure 3:
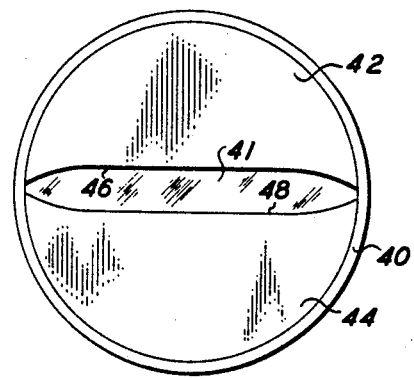
FIG. 3 is a front view of a "sagittal stop" adapted to affect illumination at the image plane.

FIG. 3 shows another embodiment of a "sagittal stop" designed not only to reduce oblique spherical aberration and astigmatism but also to affect the relative illumination across the image plane of the optical system in which it is employed. Because of the configuration of the "sagittal stop" shown in FIG. 3, the illumination across the image plane would tend to be greater in the center than at the edges. This may be desirable in transparency projection apparatus where the background area surrounding the projected image is dark since the human eye would prefer a gradual increase in illumination across its area of vision than a drastic differential at the edge of the projection as would occur if the illumination at the edges of the image were as bright as the illumination in the center thereof. The "sagittal stop" shown in FIG. 3 is mounted within a frame 40 and is comprised of two opaque members 42 and 44 each with a similarly formed arcuate edge approximately equally spaced from the center line of the mounting or frame 40. There is a plane surface 41 made of a transparent material such as glass, to better maintain the structure within the frame 40. The edge 46 on the member 42 and the edge 48 on the member 44 are arcuately shaped similarly to each other in such a manner that the greatest distance between them occurs in the geometric center of the housing and the smallest separation therebetween occurs near the edge or circumference of the housing.

Figure 4:
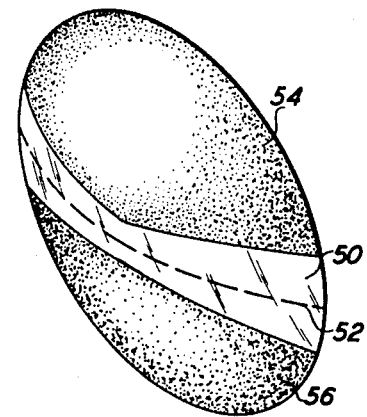
FIG. 4 is a front view of another embodiment of a sagittal stop and a lens.

Another embodiment of a "sagittal stop" is shown in FIG. 4. The "sagittal stop" is mounted directly to a lens 50 with center line 52. The stop may be painted on the lens or taped or in some other way formed to provide opaque sections 54 and 56 approximately equally spaced from the lens' tangential axis 52. The shape of the stop as formed by opaque segments 54 and 56 is generally bow-tie in shape if viewed from the front of the lens 50. This configuration permits an even illumination across an image of an evenly illuminated object by compensating for the normally brighter center than edges of an image formed from an evenly illuminated object due to the well-known $\cos^4$ law.

The "sagittal stop" has the added advantage over general aperture stops in that it may be adjacent the lens system with which it cooperates or approximately close thereto or, in fact, located between elements of the lens or in the same plane as the aperture stop of the lens system. The shape of the "sagittal stop" may be such to effect any desired relative illumination across the image plane of the optical system in which it is interposed. If the stop is located near but not adjacent the lens system it tends to act as a field stop as the width of the object is increased off the axis of the "sagittal stop." However, with a very narrow format such as that used in facsimile apparatus where the width of the field may be on the order of .01 inch or .005 inch. the "sagittal stop" can be positioned very near to the object or image. The axis of the "sagittal stop" would usually but not necessarily, coincide with the optical axis of the system.

If an optical system corrected for oblique spherical aberration in the tangential plane is set for a fixed illumination on a fixed photoreceptor in order to affect proper exposure and imaging on the photoreceptor and the relative illumination of the system is fixedly increased whereby the image would tend to be overexposed, a "sagittal stop" may be inserted into the system decreasing the illumination while increasing the image quality without necessitating variable iris diaphragms and the complicated equipment associated therewith or a change in the lenses of the system. This advantage can be realized if an optical system uses two or more photoreceptors of different speeds. If the system is set for the slower speed photoreceptor and a faster receptor is then inserted into the system, the extra illumination striking the photoreceptor may be eliminated by inserting a "sagittal stop" between the illumination source and the photoreceptor; thereby eliminating the need for a changeover of the lens elements or a variable iris diaphragm. The lens mounting or such a system may be grooved or slotted to accommodate a "sagittal stop" mounted similarly to that shown in FIG. 3. Another example of a benefit of the "sagittal stop" for easily controlling the illumination is in a device using two magnifications where a reduction in image size causes an increase in illumination.

As a practical matter, in a lens system which is designed to employ a sagittal stop, the lenses should be designed to correct for oblique spherical aberration in the tangential plane to the best or desired level of which such a lens system is capable and then incorporate the use of a "sagittal stop" to compensate for oblique spherical aberration in the sagittal direction thereby effiectively correcting for both tangential and sagittal oblique spherical aberration at the image plane. The "sagittal stop" not only reduces sagittal oblique spherical aberrration but reduces lateral astigmatism in the sagittal plane, i.e., it reduces the height of the blur around the chief ray of the object in the sagittal plane.

Figure 5:
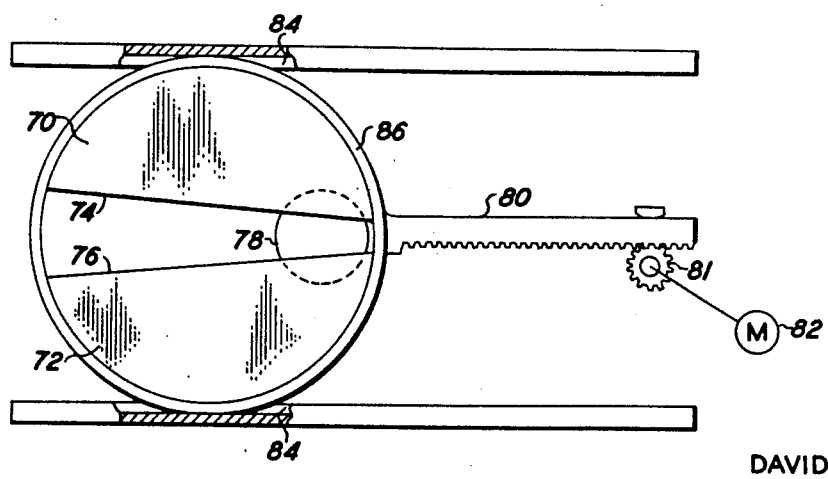
FIG. 5 is a front view of another embodiment of a "sagittal stop" adapted to be moved across the optical axis of a lens system.

FIG. 5 shows a special adaptation of the "sagittal stop" for use in a system requiring compensation for illumination. As shown, the edges of the members forming the aperture through the "sagittal stop" are non-parallel with each other providing a change in area across differential increments across the length of the edges of the "sagittal stop." Therefore, by laterally moving the "sagittal stop" across the aperture stop of the lens system one can affect the amount of light passing through the system to the image.

The side members forming the "sagittal stop" are designated here as 70 and 72 with edges on each respectively 74 and 76. The effective stop of the system is represented by the numeral 78. The light rays capable of transcending from an object to an image through the "sagittal stop" and the effective aperture 78 is defined on the top and bottom by the area between the edges 74 and 76 of the "sagittal stop" and on the sides by the inner area of the circle formed by the effective aperture stop 78. In order to increase the illumination traversing the optical system represented here, the "sagittal stop" may be moved to the right by a suitable mechanism such as a rack 80 and pinion 81 connected to a reversible motor 82 and suitable guide rails 84 to maintain proper orientation of the "sagittal stop" frame 86 when its stop is moved. Because of the orientation of the edges 74 and 76 of the members 70 and 72 respectively as the "sagittal stop" mechanism held within frame 86 is moved to the right, the area between the edges 74 and 76 within the aperture circle 78 is increased, thereby increasing the amount of illumination that can travel therethrough. This ability of lateral movement of the "sagittal stop" to vary the illumination of the optical system provides for a simple mechanism to affect the quantity of illumination at the image plane of an optical system for a given illumination input.

There is a sacrifice of sagittal oblique spherical aberration in the structure as shown in the "sagittal stop" of FIG. 5 since the area on one side of the image will receive more oblique sagittal rays than the area on the other side due to the expanding shape of the two edges forming the "sagittal stop." This, however, is not critical and in practical optical application requiring automatic or manual changes of aperture to effect illumination passing through the optical system the slight sacrifice to the quality of the image would be outweighed.

The change in the effective aperture of FIG. 5 may be accomplished in any manner or automated to any extent either electrically or mechanically or both and remain within the scope and spirit of the invention.

Is should be noted that in this stop, as in the others described, the edges of the "sagittal stop" may be formed by appropriately stamping a material to provide for the aperture required for the "sagittal stop" of a given system.

What is claimed is:

1. An improved optical system for imaging an elongated format comprising
   information characterized by an elongated format positioned at an object plane,
   illumination means to illuminate said information of elongated format,
   lens means optically positioned to receive illumination rays from said information of elongated format and project said rays in image configuration onto an imaging plane,
   aperture means positioned in close proximity to said lens means to control illumination at the image plane, and
   masking means interposed in the optical path defining a sagittal ray stop in which the opening of the stop has one dimension which is parallel to the elongated format for transmitting tangential rays and another dimension perpendicular to the elongated format which is less than the sagittal beam transmitted, said perpendicular dimension being directly proportional to the distance from the image plane to the sagittal ray stop divided by the distance from the image plane to the lens exit pupil times the opening of the aperture means in the sagittal direction to reduce sagittal rays at the image plane without affecting tangential rays thereat thereby achieving a high quality image.

2. An improved optical system for an elongated format comprising
   information characterized by an elongated format positioned at an object plane,
   illumination means to illuminate said information of elongated format,
   lens means optically positioned to receive illumination rays from said information of elongated format and project said rays in image configuration onto an imaging plane,
   aperture means positioned in close proximity to said lens means to control illumination at the image plane, and
   masking means interposed in the optical path defining a sagittal ray stop in which the opening of the stop has one dimension which is parallel to the elongated format for transmitting tangential rays and another dimension perpendicular to the elongated format which is less than the sagittal beam transmitted, said perpendicular dimension being directly proportional to the distance from the object plane to the sagittal ray stop divided by the distance of the object plane to the lens entrance pupil times the opening of the aperture means in the sagittal direction to reduce sagittal rays at the image plane without affecting tangential rays thereat thereby achieving a high quality image.

3. The system of claim 2 wherein the edges of said stop are shaped to control relative illumination across the image plane.

4. The system of claim 2 wherein said masking means include means for moving said stop relative and substantially parallel to the long dimension of the format.

5. The system of claim 1 wherein the edges of said stop are shaped to control relative illumination across the image plane.

6. The system of claim 1 wherein said masking means include means for moving said stop relative and substantially parallel to the long dimension of the format.

7. An optical system according to claim 1 wherein said lens means is corrected for oblique spherical aberration in the tangential plane.

References Cited

UNITED STATES PATENTS

| | | | |
|---|---|---|---|
| 3,097,255 | 7/1963 | Farquhar et al. | 350—206 |
| 1,247,682 | 11/1917 | Howell | 95—64 |
| 1,364,278 | 1/1921 | Hochstetter | 350—205 |
| 1,924,700 | 8/1933 | Thilo | 95—64 |

FOREIGN PATENTS

| | | |
|---|---|---|
| 346,902 | 4/1931 | Great Britain. |
| 1,432,780 | 2/1966 | France. |
| 346,421 | 2/1937 | Italy. |

PAUL R. GILLIAM, Primary Examiner

U.S. Cl. X.R.

350—17, 266